W. JARGSTORF.
DRAINING PAN.
APPLICATION FILED JUNE 22, 1915.

1,185,677.

Patented June 6, 1916.

INVENTOR
William Jargstorf
BY
Arthur Phelps Marr
ATTORNEY

UNITED STATES PATENT OFFICE.

WILLIAM JARGSTORF, OF NEW YORK, N. Y.

DRAINING-PAN.

1,185,677.  Specification of Letters Patent.  Patented June 6, 1916.

Application filed June 22, 1915. Serial No. 35,524.

*To all whom it may concern:*

Be it known that I, WILLIAM JARGSTORF, a citizen of the United States, and resident of the borough of Brooklyn, county of Kings, city and State of New York, have invented certain new and useful Improvements in Draining-Pans, of which the following is a specification.

This invention relates to certain devices commonly termed draining pans but which are really draining troughs or trays.

The device is made of metal or other material not directly affected by water and is of such a shape that when wet dishes or other articles are placed thereon the water from the dishes will not collect in the tray, but upon being received by the tray will be ejected therefrom into a basin, sink, or other receptacle.

The advantages of this invention then reside in the fact that the surface which receives the dishes is kept free of water and that it does not become necessary for the user to remove the water from the draining pan even though the pan be used continuously and for a great length of time.

Another advantage resides in the fact that means are provided for supporting irregularly shaped articles on the pan and for preventing accidental movement of any articles arranged thereon, even though the pan be, as is desired, placed at an angle.

Details of construction and operation of my device will be fully set forth as the specification progresses.

Figure 1:
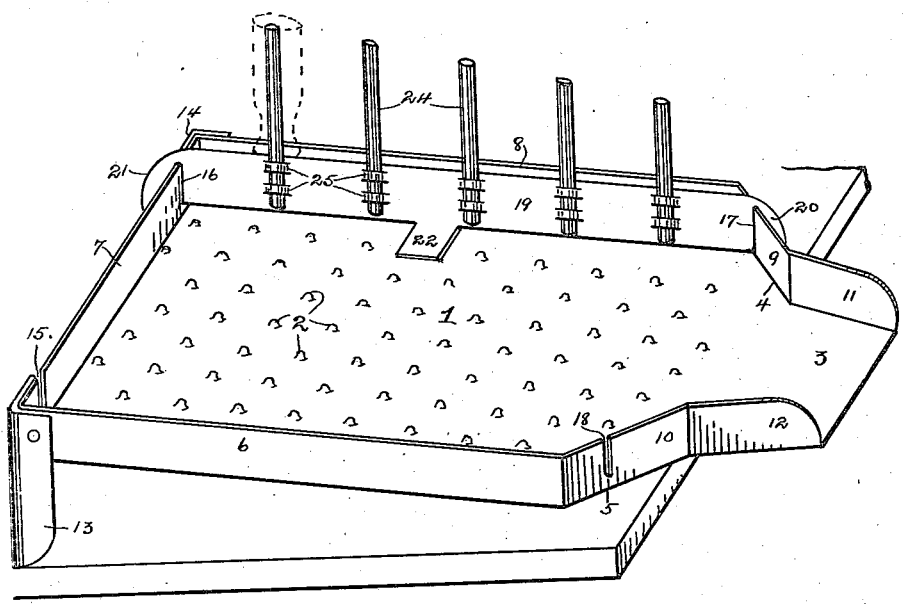
Figure 2:
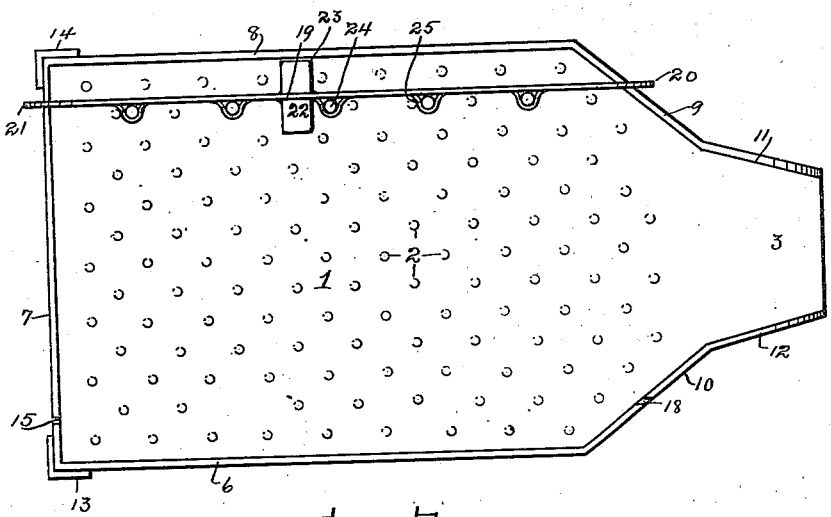

The following is what I consider the best means of carrying out this invention and the accompanying drawings form a part of this specification, in which, Figure 1 shows, in perspective, my device in operable position. Fig. 2 is a plan view.

Similar reference numerals indicate like parts in all of the figures where they appear.

The tray or pan which forms the body member of my device may be formed of sheet iron or any suitable material and I prefer, if formed of iron, that all of the metallic parts be enameled or galvanized to protect against rust, not only because rust would shorten the life of the device but because the presence of rust would be objectionable in that it would mark or otherwise disfigure articles placed upon or adjacent to the device.

The tray is formed of a bottom indicated at 1 in which I produce a plurality of upwardly extending projections as indicated at 2. These projections serve to roughen the bottom of the tray and to prevent dishes or other articles placed thereon from sliding away from the position in which they are placed.

One end of the tray is squared and the other end tapered from each side as indicated at 4 and 5 the tapers terminating in a delivery chute 3 from which water, which would otherwise collect upon the tray, will be delivered therefrom.

Formed integral with the bottom I arrange upwardly extending sides 6, 7, and 8, and I also upturn the edges of the angular portions 4 and 5 as indicated at 9 and 10; the chute should also be provided with upward extensions as indicated at 11 and 12. All of these upward extensions serve to confine the water within the outline of the tray and cause it to be delivered only through projecting chute 3.

To induce the flow of water toward the chute 3 I elevate the opposite end of the tray by arranging or securing adjacent thereto a plurality of legs as indicated at 13 and 14. These legs may be of any convenient height but it is really only necessary that they be of a height sufficient to cause a movement of the water in the proper direction; in fact, I prefer that the legs be not extended to too great a height as to do so would interfere with the proper arrangement of the material on the tray.

In the back member 7 I produce a plurality of slits or saw-kerfs 15 and 16 and I also produce a saw-kerf in each of the angled members 9 and 10 as indicated at 17 and 18.

I provide a strip of metal as indicated at 19 with hooked ends as indicated at 20 and 21. This strip of metal should be of sufficient length to extend between one of the saw-kerfs in the member 7 and a directly opposite saw-kerf in one of the angled members 9 and 10, and it is between two of these saw-kerfs that the member 19 will be engaged. This member 19 will also be provided with right angled extensions 22 and 23 which will rest upon the bottom 1 of the tray and assist in steadying the member 19. Supported by this member 19 are a plurality of upwardly projecting pins 24 which may be short lengths of dowel or metal rod, and in the preferred construction the pins 24 will be of unequal length; the one nearest the chute 3 being the shorter and the one adjacent to the back edge of the tray being the longer. I provide these pins for the purpose of supporting bottles, deep glasses or other cylindrical members which might not stand firmly upon the slightly inclined tray.

To support the pins 24 I produce a plurality of slits in the member 19 and force the metal between the slits from the plane of the member 19 as indicated at 25, then passing the rod through the space between the body of the member 19 and the outwardly forced strips 25 produced by the slits, I may secure it by closing the strips 25 closely around the pins. I may utilize any number of pins 24 all of which may be of equal length.

Having carefully and fully described my invention what I claim and desire to secure by Letters Patent is:

1. A draining pan comprising a tray having an upwardly extending end and sides, an angularly arranged chute formed integral with and projecting from the other end of said pan, said ends being provided with saw-kerfs, means for elevating the end of said pan opposite said chute and an adjustable member the ends of which are hooked, adapted to serve with said pan and to engage in said saw-kerfs to support cylindrical bodies thereon as and for the purpose set forth.

2. A draining pan comprising a tray having an upwardly extending end and sides, an angularly arranged chute formed integral with and projecting from the other end of said pan, said elevated end and the sides of said chute being provided with saw-kerfs, means for elevating the end of said pan opposite said chute, and an adjustable member having a plurality of pins of different lengths and adapted to serve with said pan and to engage in said saw-kerfs to support cylindrical bodies thereon as and for the purpose set forth.

Signed at New York city, in the county and State of New York this 2nd day of June, 1915.

WM. JARGSTORF.

Witnesses:
G. E. S. MARR,
ARTHUR PHELPS MARR.